United States Patent Office 3,247,162
Patented Apr. 19, 1966

3,247,162
POLYESTER PLASTIC COMPOSITIONS LIGHT STABILIZED WITH NITRO ORGANIC COMPOUNDS
Gordon C. Newland and John W. Tamblyn, Kingsport, Tenn., assignors to Eastman Kodak Company, Rochester, N.Y., a corporation of New Jersey
No Drawing. Filed Dec. 28, 1961, Ser. No. 162,959
8 Claims. (Cl. 260—45.9)

This invention relates to polyester plastic compositions.

Polyesters, as is well known in the art, are normally solid, thermoplastic, polymeric compounds obtained as by the esterification of polybasic carboxylic acids with polyhydric alcohols. They have achieved widespread use as materials of construction in fibers, films, sheeting, shaped articles and the like.

Polyesters present a problem, however, in that they are adversely affected by light and particularly ultraviolet light. For example, after prolonged exposure to ultraviolet light, polyester films tend to become brittle and to crack upon flexure.

A general object of this invention is to provide a solution to this problem.

A specific object of this invention is to provide a polyester plastic composition containing an additive effective to stabilize the polyester component thereof relative to ultraviolet light.

These and other objects are achieved by this invention which broadly is based on our discovery that the introduction of one or more nitro groups into aromatic, organic chemical compounds at certain positions in their molecules converts certain ones of these compounds, but not all aromatic, organic chemical compounds, into effective light stabilizers for polyesters and causes others of these compounds to be substantially and dramatically enhanced in their light stabilization effects on polyesters.

In summary, this invention broadly comprises a light stabilized, polyester plastic composition consisting essentially of (1) a polyester component and (2) an aromatic nitro compound that is a member of the group consisting of o-Nitrophenol,
1,3,5-trinitrobenzene,
2,4,6-trinitrobenzene,
5-hydroxy-2-nitrophenylbenzoate,
N-(p-nitrobenzylidene)-p-anisidine,
3,5-dinitroanisole,
1,5-dinitroanthraquinone,
1-p-nitrophenylpyrazole,
o-Nitrobenzaldehyde phenylhydrazone,
2,6-dinitroaniline,
1,8-dinitroanthraquinone,
1-nitroanthraquinone,
N-(o-nitropiperonylidene)-p-toluidine,
3-methyl-1-p-nitrophenylpyrazole,
6-nitro-N-phenyl-o-anisidine,
p-nitrobenzaldehyde phenylhydrazone,
m-Nitrobenzaldehyde phenylhydrazone,
3-hydroxy-4-nitrophenylbenzoate,
p-Nitrophenol,
2,4-dinitrophenol,
2,4-dinitroaniline,
2,3,5-trinitroanisole,
4,4'-dinitrostilbene,
2,4,6-trinitrotoluene,
3,4-dinitroaniline,
3-ethyl-4-methyl-1-(p-nitrophenyl)pyrazole,
N,N'-bis(o-nitrobenzylidene)-p-phenylenediamine,
2,4,6-trinitroanisole,
2-(2,4,6-trinitroanilino)ethanol,
4,4'-dinitrobibenzyl,
N-(o-nitrobenzylidene)-p-anisidine, and
α-p-Anisylimino-2-nitrotoluene.

Certain ones of the aromatic nitro compounds in this group compared to others in the group are vastly superior light stabilizers for polyesters. Consequently, this invention in its more specific aspects comprises a light stabilized, polyester plastic composition consisting essentially of a polyester component and an aromatic nitro compound selected from the group consisting of 2,3,5-trinitroanisole,
4,4'-dinitrostilbene,
2,4,6-trinitrotoluene,
3,4-dinitroaniline,
3-ethyl-4-methyl-1-(p-nitrophenyl)pyrazole,
N,N'-bis(o-nitrobenzylidene)-p-phenylenediamine,
2,4,6-trinitroanisole,
2-(2,4,6-trinitroanilino)ethanol,
4,4'-dinitrobibenzyl,
N-(o-nitrobenzylidene)-p-anisidine, and
α-p-Anisylimino-2-nitrotoluene.

The effectiveness of these aromatic nitro compounds as light stabilizers for polyesters does not depend on the composition of the polyester component; these aromatic nitro compounds are effective light stabilizers for any individual, light unstable, polyester and for any light unstable, polyester blend.

Concentration of the aromatic nitro compounds in the polyester composition of this invention can vary. In general, it depends upon the extent of light stabilization desired. This in turn depends upon many variables, including the end use of the polyester plastic composition. However, for most purposes a concentration of the aromatic nitro compound in a range from about 0.1 to about 10% by weight of the polyester component is an effective light stabilization concentration and gives satisfactory results.

The polyester composition of this invention is prepared by incorporating the aromatic nitro compound into the polyester component. Such incorporation is accomplished by any of the several known melt compounding and dope compounding procedures commonly employed for polyester compositions.

This invention is further illustrated by the following examples of various aspects thereof including specific embodiments. Unless otherwise indicated, this invention is not limited to these embodiments.

*Example 1*

This example illustrates various, specific embodiments of the light stable, polyester plastic composition of this invention and the preparation of these specific embodiments by dope compounding.

Dissolve in tetrachloroethane 5 parts by weight of one of the additives listed in the following Table I and 95 parts by weight of a polyester made from 4,4'-sulfonyl dibenzoic acid, azelaic acid and 1,5-pentanediol on about a 1:1:2 mole basis. Cast the resulting solution or "dope"

as a film of thickness of about 3 mils. Remove the tetrachloroethane from the film by evaporation.

To test the light stability of the film, cut it into test specimens and expose the specimens in an Atlas Twin-Arc Weather-Ometer modified by the addition of ten 20-watt Westinghouse fluorescent sun lamps. Periodically test the specimen for brittleness and record the time it takes for brittleness to develop. The condition of brittleness is deemed to be reached when the film specimen breaks on one hard crease with the exposed side of the film on the outside of the crease.

For purposes of comparison, prepare and test at the same time by the same procedures a film of the same polyester without any additive.

On the basis of these exposure tests determine the stabilization rating of each polyester composition and thus of the corresponding additive involved. Stabilization rating is the ratio of the exposure time required for the development of brittleness in the stabilized film to the exposure time required for the development of brittleness in the unstabilized film. Typical stabilization ratings of these polyester compositions and thus of the additives are set out in the following Table I.

TABLE I

| Additive: | Stabilization rating |
| --- | --- |
| None | 1 |
| o-Nitrophenol | 2 |
| 1,3,5-trinitrobenzene | 2 |
| 2,4,6-trinitrobenzene | 2 |
| 1,5-dinitroanthraquinone | 4 |
| 1-nitroanthraquinone | 5 |
| 1,8-dinitroanthraquinone | 5 |
| 6-nitro-N-phenyl-o-anisidine | 5 |
| 2,6-dinitroaniline | 5 |
| p-Nitrophenol | 6 |
| 2,4-dinitrophenol | 6 |
| 2,4-dinitroaniline | 6 |
| 4,4'-dinitrostilbene | 8 |
| 3,4-dinitroaniline | 10 |
| 3-ethyl-4-methyl-1-(p-nitrophenyl)pyrazole | 11 |
| 2,4,6-trinitroanisole | 14 |
| 2,(2,4,6-trinitroanilino)ethanol | 16 |
| 4,4'-dinitrobibenzyl | 18 |
| N-(o-nitrobenzylidene)-p-anisidine | 26 |

Each one of the aromatic nitro compounds listed in Table I stabilize polyesters to a significant extent relative to ultraviolet light. However, the specific aromatic nitro compounds: 4,4'-dinitrostilbene, 3,4-dinitroaniline, 3-ethyl-4-methyl-1-(p-nitrophenyl)pyrazole, 2,4,6-trinitroanisole, 2-(2,4,6-trinitroanilino)ethanol, 4,4'-dinitrobibenzyl, N-(o-nitrobenzylidene)-p-anisidine, typically, are much more effective than the other aromatic nitro compounds in the table and, therefore, are regarded as members of a preferred group of the aromatic nitro compounds of this invention.

*Example 2*

This example illustrates other specific embodiments of the light stable polyester plastic composition of this invention and their preparation by dope compounding.

Dissolve in tetrachloroethane 5 parts by weight of one of the additives listed in the following Table II and 95 parts by weight of a polyester made from 4,4'-sulfonyldibenzoic acid, sebacic acid and 1,5-pentanediol on about a 1:1:2 mole basis. Cast the resulting solution as a film of thickness of about 3 mils and remove the tetrachloroethane therefrom by evaporation.

To test the light stability of the film, cut it into test specimens and follow the exposure test procedure of Example 1. For purposes of comparison prepare and test at the same time by the same procedures a polyester film containing the same polyester component but no additive. Typical stabilization ratings of these particular polyester compositions and thus of the additives are given in the following Table II.

TABLE II

| Additive: | Stabilization rating |
| --- | --- |
| None | 1 |
| N-(p-nitrobenzylidene)-p-anisidine | 3 |
| 5-hydroxy-2-nitrophenyl benzoate | 3 |
| 3,5-dinitroanisole | 4 |
| o-Nitrobenzaldehyde phenylhydrazone | 4 |
| 3-hydroxy-4-nitrophenyl benzoate | 5 |
| p-Nitrobenzaldehyde phenylhydrazone | 5 |
| m-Nitrobenzaldehyde phenylhydrazone | 5 |
| N-(o-nitropiperonylidene)-p-toluidine | 5 |
| 2,3-5-trinitroanisole | 7 |
| N,N'-bis(o-nitrobenzylidene)-p-phenylenediamine | 11 |

These typical stabilization ratings are evidence of the efficacy of the aromatic nitro compounds in light stabilizing polyesters generally. Typically, while all of the listed aromatic nitro compounds are effective light stabilizers for polyesters, 2,3,5-trinitroanisole and N,N'-bis(o-nitrobenzylidene)-p-phenylenediamine are the most effective of those listed.

*Example 3*

This example illustrates still other specific embodiments of the light stable polyester composition of this invention, their preparation and typical results obtained in testing their light stability.

The following table indicates the parts by weight concentration of the additive as well as the particular additive involved. Dry mix the additive in the parts by weight concentration indicated with 100 parts by weight of a polyester made from 4,4'-sulfonyl dibenzoic acid and 1,5-pentanediol in a 1:1 mole basis. Extrude the resulting mixture as a 20 mil thick film from a 1¼-inch diameter, electrically heated, screw extruder having a band length of 18 inches. During the extrusion maintain a band temperature of 560° F. and a die temperature of 530° F. Cut test specimens 2½ x ½ inch from the extruded film and expose these test specimens in an Atlas Twin-Arc Weather-Ometer modified by the addition of ten 20-watt Westinghouse fluorescent sun lamps. Follow the degradation of the films by flexural strength measurements (Tour-Marshall Procedure ASTM–D–747–43).

For purposes of comparison prepare and test at the same time by the same procedure a polyester film of the same polyester component without any additive.

Typical test data is summarized in the following Table III.

TABLE III

| Additive | Additive Concentration, Parts by Weight | Exposure Time in Hours Required to Reduce Flexural Strength to 75 Percent of Initial |
| --- | --- | --- |
| None | | 300 |
| 1-p-nitrophenylpyrazole | 1 | 420 |
| 1,3,5-trinitrobenzene | 0.5 | 480 |
| 3-methyl-1-p-nitrophenylpyrazole | 1 | 500 |
| 2,4,6-trinitrotoluene | 0.5 | 1,000 |
| α-p-Anisylimino-2-nitrotoluene | 3 | >1,500 |

While each of the listed aromatic compounds is effective to stabilize polyesters generally, typically 2,4,6-trinitrotoluene and α-p-anisylimino-2-nitrotoluene are the most effective of those listed.

Typical results similar to those of the preceding examples are obtained with the aromatic nitro compounds of this invention incorporated into polyester plastic compounds of this invention incorporated into polyester plastic compositions regardless of the polyester component involved. This can be demonstrated by admixing 5 parts by weight of any of the aromatic nitro compounds listed in Tables I, II and III with a polyester component prepared from terephthalic acid and 1,4-cyclohexanedimethanol on a 1:1 mole basis or with a polyester component prepared from terephthalic acid, isophthalic acid and 1,4-cyclohexanedimethanol on about a 5:1:6 mole basis, and then melt-extruding test films of these polyester plastic compositions at temperatures of about 515° F. to 610° F.

Thus, this invention provides a polyester plastic composition wherein a normally light-unstable polyester component is light stabilized with an additive.

Other embodiments, advantages and features of this invention will be apparent to those in exercise of ordinary skill in the art after reading the foregoing disclosure. All embodiments of this invention including variations and modifications embracing the spirit and essential characteristics of this invention are within the scope of the claimed subject matter unless expressly excluded by claim language.

We claim:

1. A light-stabilized polyester plastic composition consisting essentially of a normally light-unstable polyester component of a polybasic carboxylic acid and a polyhydric alcohol and at a light stabilzing concentration an aromatic nitro compound selected from the group consisting of o-nitrophenol,
1,3,5-trinitrobenzene,
2,4,6-trinitrobenzene,
5-hydroxy-2-nitrophenylbenzoate,
N-(p-nitrobenzylidene)-p-anisidine,
3,5-dinitroanisole,
1,5-dinitroanthraquinone,
1-p-nitrophenylpyrazole,
o-nitrobenzaldehyde phenylhydrazone,
2,6-dinitroaniline,
1,8-dinitroanthraquinone,
1-nitroanthraquinone,
N-(o-nitropiperonylidene)-p-toluidine,
3-methyl-1-p-nitrophenylpyrazole,
6-nitro-N-phenyl-o-anisidine,
p-nitrobenzaldehyde phenylhydrazone,
m-nitrobenzaldehyde phenylhydrazone,
3-hydroxy-4-nitrophenylbenzoate,
p-nitrophenol,
2,4-dinitrophenol,
2,4-dinitroaniline,
2,3,5-trinitroanisole,
4,4'-dinitrostilbene,
2,4,6-trinitrotoluene,
3,4-dinitroaniline,
3-ethyl-4-methyl-1-(p-nitrophenyl)pyrazole,
N,N'-bis(o-nitrobenzylidene)-p-phenylenediamine,
2,4,6-trinitroanisole,
2-(2,4,6-trinitroanilino)ethanol,
4,4'-dinitrobibenzyl,
N-(o-nitrobenzylidene)-p-anisidine and
α-p-anisylimino-2-nitrotoluene.

2. A light-stabilized polyester plastic composition consisting essentially of a normally light-unstable polyester component of a polybasic carboxylic acid and a polyhydric alcohol and at a concentration in a range from about 0.1 to about 10% by weight of said polyester component an aromatic nitro compound selected from the group consisting of 2,3,5-trinitroanisole,
4,4'-dinitrostilbene,
2,4,6-trinitrotoluene,
3,4-dinitroaniline,
3-ethyl-4-methyl-1-(p-nitrophenyl)pyrazole,
N,N'-bis(o-nitrobenzylidene)-p-phenylenediamine,
2,4,6-trinitroanisole,
2-(2,4,6-trinitroanilino)ethanol,
4,4'-dinitrobibenzyl,
N-(o-nitrobenzylidene)-p-anisidine and
α-p-anisylimino-2-nitrotoluene.

3. A light-stabilized polyester plastic composition according to claim 2 wherein said polyester component comprises a polyester prepared from 4,4'-sulfonyldibenzoic acid, azelaic acid and 1,5-pentanediol on about a 1:1:2 mole basis.

4. A light-stabilized polyester plastic composition according to claim 2 wherein the polyester component is a polyester prepared from 4,4'-sulfonyldibenzoic acid, sebacic acid and 1,5-pentanediol on about a 1:1:2 mole basis.

5. A light-stabilized polyester plastic composition according to claim 2 wherein the polyester component is a polyester prepared from 4,4'-sulfonyldibenzoic acid and 1,5-pentanediol on about a 1:1 mole basis.

6. A light-stabilized polyester plastic composition according to claim 2 wherein said polyester component is a polyester prepared from terephthalic acid and 1,4-cyclohexane dimethanol on a 1:1 mole basis.

7. A light-stabilized polyester plastic composition according to claim 2 wherein said polyester component is a polyester prepared from terephthalic acid, isophthalic acid and 1,4-cyclohexanedimethanol on about a 5:1:6 mole basis.

8. The composition of claim 1 wherein the aromatic nitro compound is present at a concentration in a range from about 0.1 to about 10% by weight of said polyester component.

References Cited by the Examiner

UNITED STATES PATENTS

| | | | |
|---|---|---|---|
| 2,943,075 | 6/1960 | Schweitzer | 260—45.9 |
| 3,010,939 | 1/1961 | Dinsberg | 260—45.9 |
| 3,015,570 | 6/1962 | Bowman et al. | 260—32.4 |
| 3,054,766 | 9/1962 | Van Hook | 260—645 |

LEON J. BERCOVITZ, *Primary Examiner.*

ALPHONSO SULLIVAN, *Examiner.*